No. 699,450. Patented May 6, 1902.
J. CHRISTENSEN.
DEVICE FOR CORRECTING COMPASS ERRORS.
(Application filed Mar. 11, 1901.)
(No Model.) 2 Sheets—Sheet 1.
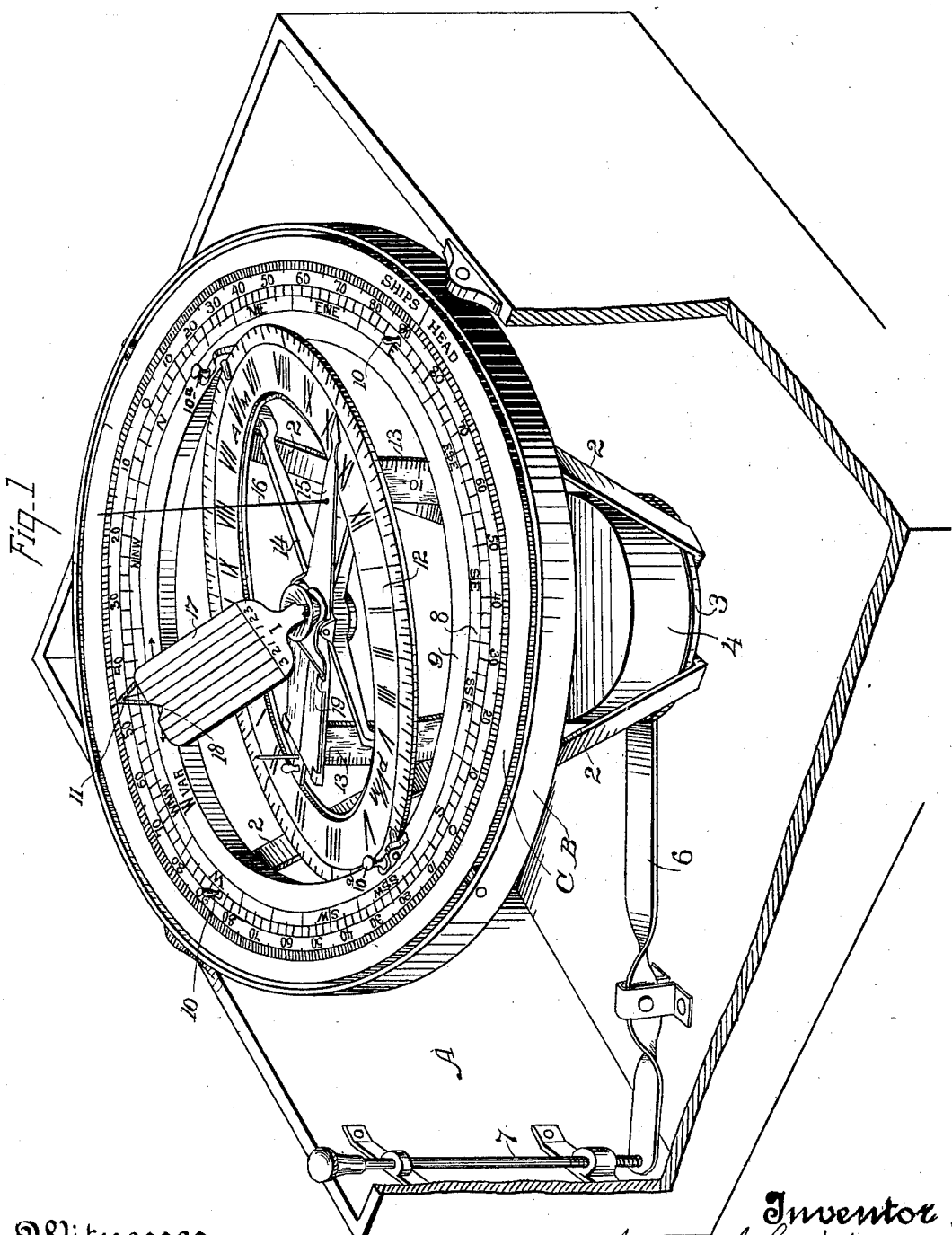

No. 699,450. Patented May 6, 1902.
J. CHRISTENSEN.
DEVICE FOR CORRECTING COMPASS ERRORS.
(Application filed Mar. 11, 1901.)
(No Model.) 2 Sheets—Sheet 2.
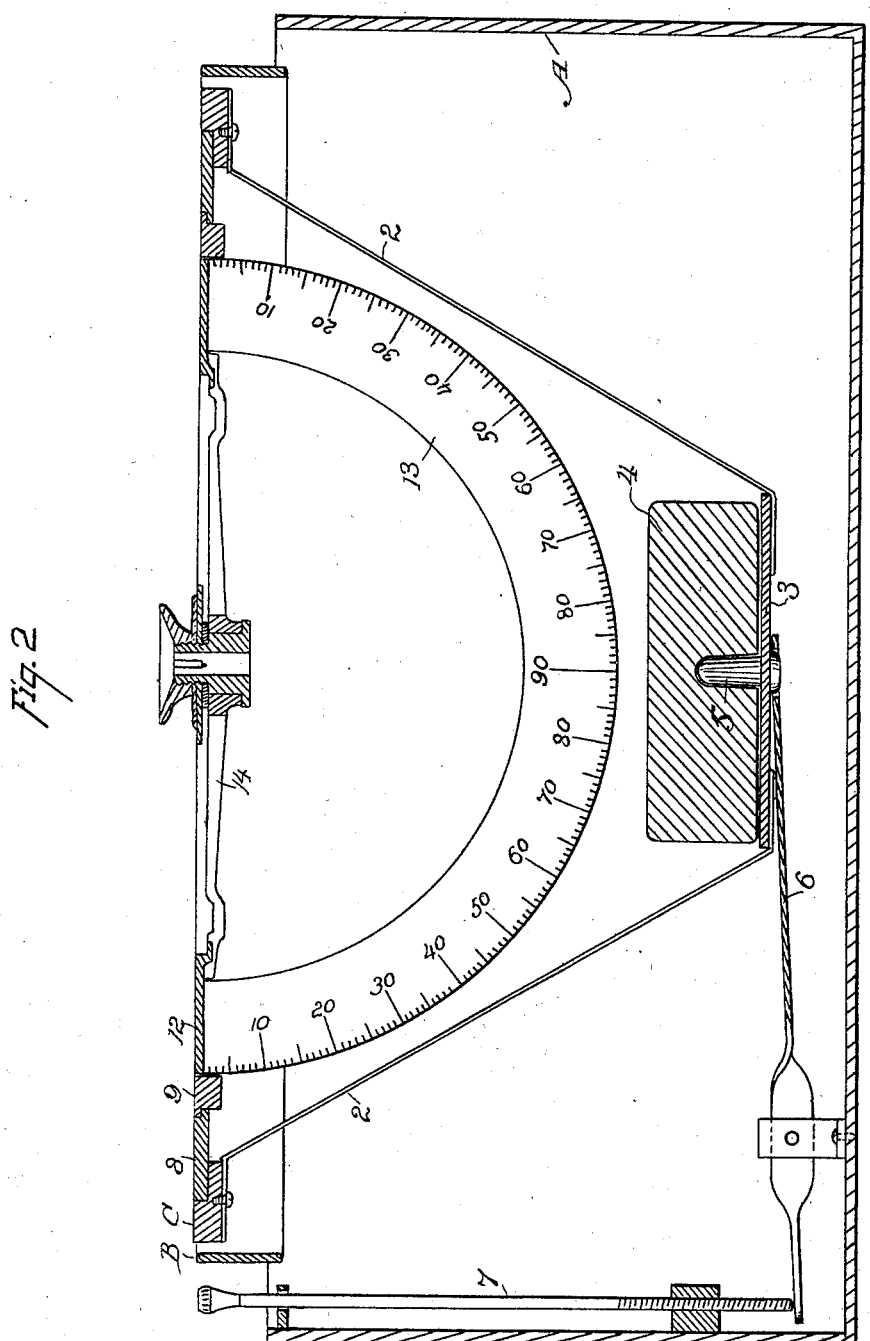

UNITED STATES PATENT OFFICE.

JORGEN CHRISTENSEN, OF SAN FRANCISCO, CALIFORNIA.

DEVICE FOR CORRECTING COMPASS ERRORS.

SPECIFICATION forming part of Letters Patent No. 699,450, dated May 6, 1902.

Application filed March 11, 1901. Serial No. 50,594. (No model.)

*To all whom it may concern:*

Be it known that I, JORGEN CHRISTENSEN, a citizen of the United States, residing in the city and county of San Francisco, State of California, have invented an Improvement in Devices for Correcting Compass Errors; and I hereby declare the following to be a full, clear, and exact description of the same.

My invention relates to an apparatus which is designed for the correction of compass errors of any description, such as errors of deviation, which may arise by reason of the character of the cargo or from other sources. It also enables the user to obtain accurate bearings and to correct the vessel's course.

It consists of a ring having the points of compass and degrees marked thereon, an exterior support in which said ring is turnable, said exterior support being so suspended and counterweighted within a suitable support that it retains its horizontal position under any movements of the vessel. Within the compass-ring another ring is fitted and turnable independently thereof, and within this ring a peculiarly subdivided clock-face is pivoted and turnable to give it any angle of inclination relative to the horizon, this angle being determined by an arc graduated to show the angle of elevation. Centrally across the axis of this clock-face extends an arm or needle which is turnable about its axis in a plane parallel to the clock-face. This needle forms an indicator with relation to the subdivisions of the clock-face, carries a perpendicular shadow-pin near one end, and has a plate designed to receive the shadow of the pin. A pointer movable in unison with the clock-facing and over the compass-marked ring indicates on the instrument the compass error.

My invention also comprises details of construction which will be more fully explained by reference to the accompanying drawings, in which—

Figure 1 is a perspective view. Fig. 2 is a vertical section of the same.

A is a box or bowl which forms a convenient containing and supporting device for my apparatus.

B is a ring pivoted upon suitable journals in line at opposite sides of the center, so that it can readily tilt or swing in one direction about these supports.

C is a ring interior to the ring B and pivoted thereto at right angles with the pivots of the ring B, so that by means of these two lines of pivots the universal movement of the parts may be had with relation to the support A, and the rings can thus be maintained level or horizontal under any ordinary movements of the ship. On one side of the ring C is a mark indicating the direction of the ship's head.

2 represents arms fixed to the lower part of the ring C and extending downwardly into the box A, where they are connected with a support 3, upon which is placed a removable weight 4, sufficient to counterbalance any weight which may be carried upon the upper part of the apparatus.

I have shown a pin 5 projecting vertically from the center of the plate 3 and fitting a corresponding hole in the center of the weight 4, so that the latter must always be placed exactly central and cannot shift to one side or the other. The rings B and C thus being freely turnable on their pivots will, by reason of the weight, always maintain an essentially-horizontal position. When it is desired to lock these rings or gimbals to prevent their swinging independently, it is done by means of a fulcrumed lever 6, having a means for engaging it with the lower part of the plate or support 3, and at the outer end it is moved by a vertical screw-rod 7, so that when engaged with the swinging parts it locks them and practically makes them a part of the box without independent movement.

When the apparatus is in use, by unscrewing or moving the rod 7 the lever-arm is withdrawn, and the parts are then free to move.

Within the ring C and turnable independently thereof, but in the same plane therewith, is a ring 8, having marked upon it the points of compass and the subdivisions thereof, and also the degrees, commencing at the north and south, respectively, at zero, and marking up to ninety degrees at east and west points of the circle. Within this graduated or "compass-ring" is another ring 9. The graduated ring is turnable independently of the ring C, on which it is supported, and the ring 9 is also turnable independently of the graduated ring, but in the same plane therewith, so that an independent horizontal adjustment of these rings can be made. The rings 8 and 9 are provided with projections or handles, as at 10 10ª, respectively, by which they may be conveniently turned, and a pointer 11 upon the ring 9 extends outwardly and over the graduated ring, so that the position of the inner ring with relation to the graduated ring may be accurately noted.

12 is a ring pivoted at opposite sides in the ring 9, these pivots being at right angles with a line passing through the pointer 11 and the center of the ring 9. The ring 12 is thus turnable about its pivots to change its plane with relation to the plane of the rings 8 and 9, and it has fixed to its under side a semicircular segment 13, which is graduated in degrees from the zero at either end of the segment to ninety degrees in the center thereof, which center is in a line perpendicular to the plane of the circle 12 at the center of the latter. This graduated segment serves to show the angle of elevation or inclination of the ring 12 and is set when the apparatus is in use to show the sun's local meridian altitude wherever the vessel may be.

The surface of the disk 12 is subdivided and marked in two clock-faces, the figures "12" of each subdivision standing at opposite sides of the ring, at right angles with the pivot or fulcrum-bar, and the figures "6" standing exactly in line with the pivots about which this ring is turnable. One half of this ring, divided from "1" to "12," is used to designate the forenoon, and the other half the afternoon on either north or south side of the sun.

A cross or support 14 extends diametrically across the open center of the ring 12, and pivoted in the center of this support is a transverse arm or needle 15, one end of which serves as a hand moving over the divisions of the clock-face, and in this end is a hole or socket adapted to receive a shadow-pin 16, which when in place stands perpendicularly upon the needle, and when the ring or "hour-circle" 12 is horizontal the pin is vertical. The pivot of the needle 15 is coincident with the axis of the hour-circle. Central of the needle is a socket adapted to receive the stem of a shield 17, the stem having a feather or guide fitting a corresponding slot in the socket, so as to insure its being introduced in the exact proper position and to be turnable with the needle. The shield or plate 17 is shown as standing at an angle with its supporting-pin so as to incline backwardly in relation to the shadow-pin 16, which stands in front of it. The surface of the shield 17 is divided by parallel lines lying in planes containing the shadow-pin, and there may also be a V-shaped notch or sight 18 at the top of the central line for taking observation. The surface of the shield is at right angles to a plane which would include the axis of the shadow-pin. In conjunction with this shield 17 I have also shown a mirror 19, pivoted in line with the pivots of the clock-face 12, so that it may be turned down flat upon the needle 15, or turned up, if desired, and used in place of the shield 18. This mirror has a central line marked vertically upon its face, and the mirror may be used when the sun is not sufficiently bright to cast a shadow upon the shield, under which circumstances the reflection of the shadow-pin is thrown upon the mirror. With the sun sufficiently bright the shadow of the pin will fall upon the shield 17 and may be brought to coincide with the central line of the shield when the observation is being taken.

The operation would be as follows: Having determined beforehand, by any well-known means, the sun's approximate meridian altitude either north or south, first set off the desired course, which is assumed to be true east, by turning the compass-ring until point "E" corresponds to "Ship's head" on C; second, turn the needle 15 till it points to apparent local time on the hour-circle, either a. m. or p. m.; third, tilt the hour-circle, elevating that side on which the point of the needle 15 is until the angle between the hour-circle and the horizontal ring equals the sun's meridian altitude at that place. The proper angle of the hour-circle in relation to the horizon is determined on the segment 13, reading the degrees thereon above the ring 9. The hour-circle is then clamped so as not to turn on its pivots by means of the screws 10ª, which also serve as handles for ring 9, analogous to handles 10 on ring 8, as previously noted; fourth, turn the ring 9, carrying the hour-circle, until the shadow of the pin 16 falls directly on the center line of the shield 17. Due care having been observed during these steps not to disturb the position of the compass-ring in relation to ship's head, nor of the needle in relation to apparent local time indicated on the hour-circle, the total compass error will be shown by the pointer 11, read from "North" on compass-ring. If the sun is not bright enough to cause the pin to cast a shadow, the mirror 19 is used. In that case the shield is removed from its socket, the mirror is tilted, and the ring 9 revolved until the reflection of both the sun and shadow-pin appear. The operator stands behind the instrument and follows with his eye until the sun and pin are both bisected by the central line of the mirror, whereupon read off total compass error from "N" by pointer 11, as directed. Having determined the total compass error, deviation is readily deducible. The device is thus practically a solar azimuth-compass, but in the use of which the usual azimuth tables are not required. As the meridian altitude used need be only approximate—e. g., within five degrees on either side of the true meridian altitude will suffice—the sun's altitude observed for determining latitude the day before even can be used for ascertaining the angle or tilt of the hour-circle. A convenient method of obtaining the required meridian altitude is to subtract the local latitude from ninety degrees. To the remainder or colatitude add the declination, provided latitude and declination are of the same name. If of different name, subtract the declination from the colatitude. The result in either instance is the desired altitude. The hour-circle when thus tilted and turned would approximately contain in its plane all points in the apparent line of travel of the sun for that day, as observed from a certain fixed point. Accordingly, as the shadow-pin is perpendicular to the plane of the "track of the sun," it is obvious that, supposing the direction of the ship's head and point of locality to remain constant, the pin would always cast its shadow on the central line of the shield when the needle was turned to indicate the apparent time at any time during that day, while the pointer 11, remaining unchanged, would continue to show the same compass error. Were the hour-circle to remain constantly in a horizontal position—i. e., not be tiltable to sun's meridian altitude as above—the shadow of the pin would only coincide with the central line of the shadow-plate at noon and the compass error could then only be observed at that moment.

The purpose of the peculiarly-divided dial is to enable the hour-circle to be tilted in either direction, so that the instrument may be used on either north or south side of the sun and in either north or south latitude. For example, if the vessel were sailing south the hour-circle is tilted more each day until its plane is vertical, which would be when the sun was directly overhead. The vessel continuing its southerly course, the sun appearing in the other direction, the ring would be reversed and the needle turned to indicate the time on the side of the ring now uppermost.

To obtain bearings, set the hour-circle to coincide with the plane of the compass-ring and turn the latter till the point indicating the direction of travel is coincident with ship's head. Direct the needle upon the object to be observed, sighting by notch 18 and the shadow-pin, and read off angle on compass-ring from ship's head.

Having thus described my invention, what I claim, and desire to secure by Letters Patent, is—

1. An apparatus for correcting compass errors and the like, consisting of the weighted horizontally-suspended counterbalance-rings, a compass and degree subdivided ring turnable horizontally within the inner of the two rings, another ring turnable horizontally within the compass-ring, a ring journaled across the open center of the inner ring and having clock-subdivisions on its face, said ring having its axis substantially in the horizontal plane of the other rings, and being tiltable to show an inclination with relation to the horizontal rings, a centrally-pivoted needle turnable in the plane of the clock-ring, having a member with a central vertically-marked surface, and a shadow-pin carried by the needle and adapted to cast a shadow upon said member.

2. An apparatus for correcting compass errors and the like consisting of two rings pivoted at right angles with each other, with a counterbalance-weight whereby an essentially horizontal position of the inner ring may be maintained, a ring turnable horizontally with relation to the inner ring having degree and compass subdivisions marked upon it, another ring turnable horizontally with relation to the compass-ring, a ring pivoted within said last-named ring and turnable about its pivots to change its plane with relation to said rings, and an indicating-segment fixed thereto, subdivided to show the sun's altitude, in combination with a centrally-pivoted needle turnable in the plane of the clock-face having a shadow-pin perpendicular to it, a centrally-fixed inclined and marked surface upon which the shadow of the pin is caused to fall and a pointer turnable in unison with said third-named ring and movable over the degree-divided ring to indicate the compass error.

3. In an apparatus for indicating compass errors and the like, the universally balanced and suspended rings by which a horizontal position of the apparatus is maintained, a compass and degree divided ring turnable in the same plane with the innermost of the counterbalance-rings, a ring turnable with relation to the compass and degree ring having a pointer extending over the degree-markings, a ring having its circumference divided into two equal clock-faces for forenoon and afternoon use, said ring having its axis substantially in the horizontal plane of the last-named horizontal ring, and turnable to stand at any angle of inclination with relation thereto, a segment fixed at right angles to said clock-ring and extending through the open center of the adjacent ring, and subdivided in degrees whereby the angle of inclination is indicated, a centrally-pivoted needle turnable in the plane of the clock-face and movable over the subdivisions thereof, a shadow-pin perpendicular to and carried by said needle, a vertically-inclined shadow-plate upon said needle and turnable in unison therewith, said plate having a marked surface and a central line or sight adapted to coincide with the shadow-pin.

4. In an apparatus for determining compass errors, the combination of a horizontally-supported and movable ring having compass and degree markings thereon, an annular support within and movable in the plane of this compass-ring, a ring with clock-face markings thereon pivoted within the said annular support, and adapted when horizontal to lie in the same plane with said support and compass-ring, a needle pivoted centrally of said clock-face ring or hour-circle, and movable over said circle, a pin carried by said needle, a surface upon said needle whose plane is disposed at right angles to a plane which includes the shadow-pin, and markings on said surface with which the shadow of the pin is adapted to coincide.

5. An improved apparatus for correcting compass errors and the like, including a ring in which the compass and degree circle of the apparatus are turnable in the same plane, said support-ring being pivoted in an outer ring, and said outer ring pivoted at right angles therewith upon a support whereby universal movement and a constant horizon of the inner portion of the apparatus is obtained, an inner ring having clock-face markings said last-named ring, when horizontal, adapted to lie in the same horizontal plane with said support and compassing-arms converging downwardly from the inner support-ring, a counterbalance-weight centrally and removably carried thereby, a means for locking the parts to prevent movement consisting of a fulcrumed lever, a screw-rod by which it is moved, the inner end of said lever having a device adapted to interlock with the lower part of the counterbalance device.

In witness whereof I have hereunto set my hand.

JORGEN CHRISTENSEN.

Witnesses:
S. H. NOURSE,
CHAS. E. TOWNSEND.